(12) United States Patent
Keith, Jr.

(10) Patent No.: US 7,664,834 B2
(45) Date of Patent: Feb. 16, 2010

(54) DISTRIBUTED OPERATING SYSTEM MANAGEMENT

(75) Inventor: Robert O. Keith, Jr., Modesto, CA (US)

(73) Assignee: Maxsp Corporation, Sunnyvale, CA (US)

( * ) Notice: Subject to any disclaimer, the term of this patent is extended or adjusted under 35 U.S.C. 154(b) by 0 days.

(21) Appl. No.: 11/177,106

(22) Filed: Jul. 7, 2005

(65) Prior Publication Data

US 2006/0047946 A1     Mar. 2, 2006

Related U.S. Application Data

(60) Provisional application No. 60/586,615, filed on Jul. 9, 2004.

(51) Int. Cl.
*G06F 15/177* (2006.01)
(52) U.S. Cl. .......................................... 709/220; 713/2
(58) Field of Classification Search ................ 713/2; 709/203, 217–219, 220–222
See application file for complete search history.

(56) References Cited

U.S. PATENT DOCUMENTS

| | | | | |
|---|---|---|---|---|
| 4,866,635 | A | 9/1989 | Kahn et al. ................. 364/513 |
| 5,602,990 | A | 2/1997 | Leete ..................... 395/183.22 |
| 5,649,196 | A | 7/1997 | Woodhill et al. ............ 395/620 |
| 5,659,743 | A | 8/1997 | Adams et al. ............... 395/621 |
| 5,802,364 | A | 9/1998 | Senator et al. |
| 5,812,751 | A | 9/1998 | Ekrot et al. |
| 5,835,911 | A | 11/1998 | Nakagawa et al. |
| 5,933,647 | A | 8/1999 | Aronberg et al. |
| 5,950,010 | A | 9/1999 | Hesse et al. |
| 5,974,547 | A * | 10/1999 | Klimenko ..................... 713/2 |
| 6,012,152 | A | 1/2000 | Douik et al. .................. 714/26 |
| 6,029,196 | A | 2/2000 | Lenz ......................... 709/221 |
| 6,067,582 | A | 5/2000 | Smith et al. |
| 6,144,959 | A | 11/2000 | Anderson et al. |
| 6,170,065 | B1 | 1/2001 | Kobata et al. .................. 714/7 |
| 6,189,101 | B1 | 2/2001 | Dusenbury, Jr. |
| 6,209,089 | B1 * | 3/2001 | Selitrennikoff et al. ......... 713/2 |
| 6,212,660 | B1 | 4/2001 | Joeressen et al. ............ 714/758 |
| 6,282,711 | B1 | 8/2001 | Halpern et al. |
| 6,292,827 | B1 | 9/2001 | Raz ........................... 709/217 |
| 6,301,612 | B1 * | 10/2001 | Selitrennikoff et al. ...... 709/220 |
| 6,311,221 | B1 | 10/2001 | Raz et al. ................... 709/231 |
| 6,317,761 | B1 | 11/2001 | Landsman et al. .......... 707/513 |
| 6,349,137 | B1 | 2/2002 | Hunt et al. |
| 6,356,915 | B1 | 3/2002 | Chtchetkine et al. ........ 707/200 |
| 6,363,400 | B1 | 3/2002 | Chtchetkine et al. ........ 707/200 |
| 6,366,296 | B1 | 4/2002 | Boreczky et al. ............ 345/719 |

(Continued)

OTHER PUBLICATIONS http://www.macrovision.com/products/flexnet_installshield/installshield/overview/index.shtml, pp. 1-3.

(Continued)

*Primary Examiner*—Yemane Mesfin
(74) *Attorney, Agent, or Firm*—Haverstock & Owens LLP

(57) ABSTRACT

A system and method are provided for a distributed operating system manager. In one example, the method includes retrieving an internet protocol address of a boot server connected to a client computer via a network; determining whether the boot server is available via the network; transferring to the boot server a description of an operating system on the client computer; validating hardware credentials of the client computer; and determining whether to perform a remote boot process.

21 Claims, 6 Drawing Sheets

U.S. PATENT DOCUMENTS

| | | | |
|---|---|---|---|
| 6,378,035 B1 | 4/2002 | Parry et al. | 711/110 |
| 6,421,777 B1* | 7/2002 | Pierre-Louis et al. | 713/2 |
| 6,449,658 B1 | 9/2002 | Lafe et al. | 709/247 |
| 6,463,530 B1* | 10/2002 | Sposato | 713/2 |
| 6,473,794 B1 | 10/2002 | Guheen et al. | 709/223 |
| 6,477,531 B1 | 11/2002 | Sullivan et al. | 707/10 |
| 6,490,677 B1* | 12/2002 | Aguilar et al. | 713/1 |
| 6,536,037 B1 | 3/2003 | Guheen et al. | 717/151 |
| 6,556,950 B1 | 4/2003 | Schwenke et al. | 702/183 |
| 6,574,618 B2 | 6/2003 | Eylon et al. | 707/1 |
| 6,606,744 B1 | 8/2003 | Mikurak | 717/174 |
| 6,625,651 B1 | 9/2003 | Swartz et al. | |
| 6,625,754 B1* | 9/2003 | Aguilar et al. | 714/15 |
| 6,636,857 B2 | 10/2003 | Thomas et al. | 707/10 |
| 6,654,797 B1 | 11/2003 | Kamper | 709/220 |
| 6,694,375 B1 | 2/2004 | Beddus et al. | 709/249 |
| 6,697,852 B1 | 2/2004 | Ryu | |
| 6,704,886 B1 | 3/2004 | Gill et al. | |
| 6,718,464 B2 | 4/2004 | Cromer et al. | 713/2 |
| 6,728,530 B1 | 4/2004 | Heinonen et al. | |
| 6,735,625 B1 | 5/2004 | Ponna | 709/223 |
| 6,751,658 B1* | 6/2004 | Haun et al. | 709/222 |
| 6,757,729 B1 | 6/2004 | Devarakonda et al. | |
| 6,757,894 B2 | 6/2004 | Eylon et al. | 717/177 |
| 6,816,462 B1 | 11/2004 | Booth, III et al. | 370/248 |
| 6,816,882 B1 | 11/2004 | Conner et al. | |
| 6,871,210 B1* | 3/2005 | Subramanian | 709/203 |
| 6,885,481 B1 | 4/2005 | Dawe | |
| 6,886,020 B1 | 4/2005 | Zahavi et al. | 707/204 |
| 6,915,343 B1 | 7/2005 | Brewer et al. | 709/224 |
| 6,954,853 B2* | 10/2005 | Wang et al. | 713/2 |
| 6,954,930 B2 | 10/2005 | Drake et al. | |
| 6,959,235 B1 | 10/2005 | Abdel-Malek et al. | |
| 7,003,560 B1 | 2/2006 | Mullen et al. | |
| 7,003,663 B2 | 2/2006 | Lagosanto et al. | |
| 7,058,698 B2 | 6/2006 | Chatterjee et al. | |
| 7,080,118 B2 | 7/2006 | Hildebrand | |
| 7,143,307 B1 | 11/2006 | Witte et al. | |
| 7,149,698 B2 | 12/2006 | Guheen et al. | |
| 7,178,166 B1 | 2/2007 | Taylor et al. | |
| 7,194,445 B2 | 3/2007 | Chan et al. | |
| 7,210,143 B2 | 4/2007 | Or et al. | |
| 7,237,122 B2 | 6/2007 | Kadam et al. | |
| 7,287,053 B2 | 10/2007 | Bodin | |
| 7,392,046 B2 | 6/2008 | Leib et al. | |
| 7,401,125 B1 | 7/2008 | Uchida et al. | |
| 7,512,584 B2 | 3/2009 | Keith, Jr. | |
| 2001/0034736 A1 | 10/2001 | Eylon et al. | 707/200 |
| 2001/0037323 A1 | 11/2001 | Moulton et al. | 707/1 |
| 2001/0037399 A1 | 11/2001 | Eylon et al. | 709/231 |
| 2001/0037400 A1 | 11/2001 | Raz et al. | 709/232 |
| 2001/0044850 A1 | 11/2001 | Raz et al. | 709/231 |
| 2001/0049793 A1 | 12/2001 | Sugimoto | 713/200 |
| 2002/0007418 A1 | 1/2002 | Hegde et al. | 709/231 |
| 2002/0013827 A1 | 1/2002 | Edstrom et al. | |
| 2002/0042833 A1 | 4/2002 | Hendler et al. | 709/231 |
| 2002/0049764 A1 | 4/2002 | Boothby et al. | 707/100 |
| 2002/0083183 A1 | 6/2002 | Pujare et al. | 709/231 |
| 2002/0087717 A1 | 7/2002 | Artzi et al. | 709/236 |
| 2002/0087883 A1 | 7/2002 | Wohlgemuth et al. | 713/201 |
| 2002/0087963 A1 | 7/2002 | Eylon et al. | 717/174 |
| 2002/0091763 A1 | 7/2002 | Shah et al. | 709/203 |
| 2002/0107920 A1 | 8/2002 | Hotti | |
| 2002/0116585 A1 | 8/2002 | Scherr | 711/133 |
| 2002/0124092 A1 | 9/2002 | Urien | 709/229 |
| 2002/0129089 A1 | 9/2002 | Hegde et al. | 709/200 |
| 2002/0138640 A1 | 9/2002 | Raz et al. | 709/231 |
| 2002/0157089 A1 | 10/2002 | Patel et al. | 717/178 |
| 2002/0161868 A1* | 10/2002 | Paul et al. | 709/221 |
| 2002/0161908 A1 | 10/2002 | Benitez et al. | 709/231 |
| 2002/0169797 A1 | 11/2002 | Hegde et al. | 707/500.1 |
| 2002/0188941 A1 | 12/2002 | Cicciarelli et al. | |
| 2003/0004882 A1 | 1/2003 | Holler et al. | 705/51 |
| 2003/0005096 A1* | 1/2003 | Paul et al. | 709/222 |
| 2003/0009538 A1 | 1/2003 | Shah et al. | 709/219 |
| 2003/0033379 A1 | 2/2003 | Civanlar et al. | 709/218 |
| 2003/0037328 A1 | 2/2003 | Cicciarelli et al. | |
| 2003/0041136 A1 | 2/2003 | Cheline et al. | 709/223 |
| 2003/0046371 A1 | 3/2003 | Falkner | |
| 2003/0051128 A1* | 3/2003 | Rodriguez et al. | 713/100 |
| 2003/0078960 A1 | 4/2003 | Murren et al. | |
| 2003/0110188 A1 | 6/2003 | Howard et al. | 707/200 |
| 2003/0126242 A1* | 7/2003 | Chang | 709/222 |
| 2003/0140160 A1 | 7/2003 | Raz et al. | 709/231 |
| 2003/0191730 A1 | 10/2003 | Adkins et al. | |
| 2003/0204562 A1 | 10/2003 | Hwang | |
| 2003/0233383 A1 | 12/2003 | Koskimies | |
| 2004/0010716 A1 | 1/2004 | Childress et al. | |
| 2004/0093492 A1 | 5/2004 | Daude et al. | 713/156 |
| 2004/0104927 A1 | 6/2004 | Husain et al. | |
| 2004/0123153 A1 | 6/2004 | Wright et al. | 713/201 |
| 2004/0128346 A1 | 7/2004 | Melamed et al. | 709/203 |
| 2004/0148306 A1 | 7/2004 | Moulton et al. | 707/101 |
| 2004/0201604 A1 | 10/2004 | Kraenzel et al. | 345/700 |
| 2004/0236843 A1 | 11/2004 | Wing et al. | 709/219 |
| 2005/0027846 A1 | 2/2005 | Wolfe et al. | |
| 2005/0033808 A1 | 2/2005 | Cheng et al. | |
| 2005/0044197 A1 | 2/2005 | Lai | |
| 2005/0044544 A1 | 2/2005 | Slivka et al. | |
| 2005/0108593 A1 | 5/2005 | Purushothaman et al. | |
| 2005/0144218 A1 | 6/2005 | Heintz | 709/202 |
| 2005/0149729 A1* | 7/2005 | Zimmer et al. | 713/168 |
| 2005/0160289 A1 | 7/2005 | Shay | |
| 2005/0193245 A1 | 9/2005 | Hayden et al. | |
| 2005/0216524 A1 | 9/2005 | Gomes et al. | |
| 2005/0256952 A1 | 11/2005 | Mouhanna et al. | |
| 2005/0262503 A1 | 11/2005 | Kane | |
| 2005/0273486 A1 | 12/2005 | Keith, Jr. | 709/200 |
| 2005/0283606 A1* | 12/2005 | Williams | 713/166 |
| 2006/0031407 A1 | 2/2006 | Dispensa et al. | |
| 2006/0031529 A1 | 2/2006 | Keith, Jr. | 709/227 |
| 2006/0047716 A1 | 3/2006 | Keith, Jr. | 707/203 |
| 2006/0074943 A1 | 4/2006 | Nakano et al. | |
| 2006/0095705 A1 | 5/2006 | Wichelman et al. | 711/171 |
| 2006/0179061 A1 | 8/2006 | D'Souza et al. | |
| 2007/0143374 A1 | 6/2007 | D'Souza et al. | |
| 2007/0174658 A1 | 7/2007 | Takamoto et al. | |
| 2007/0174690 A1 | 7/2007 | Kambara et al. | |
| 2007/0271290 A1 | 11/2007 | Keith, Jr. | 707/101 |
| 2007/0271428 A1 | 11/2007 | Alturi | |
| 2007/0276836 A1 | 11/2007 | Chatterjee et al. | |
| 2008/0034019 A1 | 2/2008 | Cisler et al. | |
| 2008/0034071 A1 | 2/2008 | Wilkinson et al. | |
| 2008/0209142 A1 | 8/2008 | Obernuefemann | |
| 2008/0294860 A1 | 11/2008 | Stakutis et al. | |

OTHER PUBLICATIONS http://macrovision.com/products/flexnet_installshield/installshield/index.shtml, pp. 1-2.

http://www.stealthbits.com/, pp. 1-2.

http://www.microsoft.com/technet/prodtechnol/windows2000serv/maintain/featusability/inmnwp.mspx, pp. 1-36.

http://en.wikipedia.org/wik/Expert_system, pp. 1-9.

http://www.pctools.com/registry-mechanic/, pp. 1-2.

IEEE100 The Authoritative Dictionary Of IEEE Standards Terms, Seventh Edition, Jan. 2003, 3 pages.

Bandwidth Capping at Source http://www.24onlinebilling.com/download/whitepapers/Bandwidth%20Capping%20At%20Source.pdf pp. 1-9.

IBM Corporation, AFS: "User Guide", First Edition, Version 3.6. Apr. 2000, pp. 112.

Shepler et al. "RFC 3530—Network File System (NFS) version 4 Protocol", Standards Track, Apr. 2003, pp. 278, http://tools.ietf.org/html/rfc3530#page-119.

* cited by examiner

DISTRIBUTED OPERATING SYSTEM MANAGEMENT

RELATED APPLICATIONS

This Patent Application claims priority under 35 U.S.C. 119(e) of the co-pending U.S. Provisional Pat. App. No. 60/586,615, filed Jul. 9, 2004, entitled "Virtual Desktop Architecture and Distributed Operating System Management", which is herein incorporated by reference in its entirety. The Patent Application is related to U.S. patent application Ser. No. 10/912,652, entitled "Virtual Distributed File System", filed Aug. 4, 2004, which is herein incorporated by reference in its entirety; U.S. patent application Ser. No. 11/144,263, entitled "Virtual Application Manager", filed Jun. 2, 2005, which is herein incorporated by reference in its entirety; and U.S. patent application Ser. No. 11/144,179, entitled "Transaction Based Virtual File System Optimized For High-Latency Network Connections, filed Jun. 2, 2005, which is herein incorporated by reference in its entirety.

FIELD OF THE INVENTION

The present invention relates to computer operating systems. More particularly, the present invention relates to remote management of computer operating systems over a network.

BACKGROUND OF THE INVENTION

In the past, the process of installing and updating applications as well as sharing information on a plurality of computers was arduous and time-consuming. Professionals would install software on each computer using compact discs (CDs), network shares or other similar methods. As mentioned, this is time-consuming as well as difficult to synchronize throughout an entire company. With the advent of computer networking, where a plurality of computers communicate together, the process became much more streamlined. Specifically, two techniques for delivering applications have been developed over the years, remote execution and local delivery.

In a remote execution embodiment, a user accesses software which is loaded and executed on a remote server under the control of the user. One example is the use of Internet-accessible CGI programs which are executed by Internet servers based on data entered by a client. A more complex system is the Win-to-Net system provided by Menta Software. This system delivers client software to the user which is used to create a Microsoft® Windows® style application window on the client machine. The client software interacts with an application program executing on the server and displays a window, which corresponds to one which would be shown if the application were installed locally. The client software is further configured to direct certain I/O operations, such as printing a file, to the client's system, to replicate the "feel" of a locally running application. Other remote-access systems, such as provided by Citrix Systems, are accessed through a conventional Internet Browser or a proprietary client and present the user with a "remote desktop" generated by a host computer which is used to execute the software.

Because the applications are already installed on the server system, remote execution permits the user to access the programs without transferring a large amount of data. However, this type of implementation requires the supported software to be installed on the server. Thus, the server must utilize an operating system which is suitable for the hosted software. In addition, the server must support separately executing program threads for each user of the hosted software. For complex software packages, the necessary resources can be significant, limiting both the number of concurrent users of the software and the number of separate applications which can be provided.

In a local delivery embodiment, the desired application is packaged and downloaded to the user's computer. Preferably, the applications are delivered and installed as appropriate using automated processes. After installation, the application is executed. Various techniques have been employed to improve the delivery of software, particularly in the automated selection and installation of the proper software components and the initiation of automatic software downloads. In one technique, an application program is broken into parts at natural division points, such as individual data and library files, class definitions, etc., and each component is specially tagged by the program developer to identify the various program components, specify which components are dependent upon each other, and define the various component sets which are needed for different versions of the application.

One such tagging format is defined in the Open Software Description ("OSD") specification, jointly submitted to the World Wide Web Consortium by Marimba Incorporated and Microsoft Corporation on Aug. 13, 1999. Defined OSD information can be used by various "push" applications or other software distribution environments, such as Marimba's Castanet product, to automatically trigger downloads of software and ensure that only the needed software components are downloaded in accordance with data describing which software elements a particular version of an application depends on.

Although on-demand local delivery and execution of software using OSD/push techniques is feasible for small programs, such as simple Java applets, for large applications, the download time can be prohibitively long. Thus, while suitable for software maintenance, this system is impractical for providing local application services on-demand because of the potentially long time between when the download begins and the software begins local execution.

In the more recent past, attempts have been made to use streaming technology to deliver software to permit an application to begin executing before it has been completely downloaded. Streaming technology was initially developed to deliver audio and video information in a manner which allowed the information to be output without waiting for the complete data file to download. For example, a full-motion video can be sent from a server to a client as a linear stream of frames instead of a complete video file. As each frame arrives at the client, it can be displayed to create a real-time full-motion video display. However, unlike the linear sequences of data presented in audio and video, the components of a software application can be executed in sequences which vary according to user input and other factors.

To address the deficiencies in prior data streaming and local software delivery systems, an improved technique of delivering applications to a client for local execution has been developed. This technique called "Streaming Modules" is described in U.S. Pat. No. 6,311,221 to Raz et al. In a particular embodiment of the "Streaming Modules" system, a computer application is divided into a set of modules, such as the various Java classes and data sets which comprise a Java applet. Once an initial module or modules are delivered to the user, the application begins to execute while additional modules are streamed in the background. The modules are streamed to the user in an order which is selected to deliver the modules before they are required by the locally executing software. The sequence of streaming can be varied in response to the manner in which the user operates the application to ensure that needed modules are delivered prior to use as often as possible. To reduce streaming time, the size of code files, such as library modules, can be reduced by substituting various coded procedures with shortened streaming "stub" procedures which act as link-time substitutes for the removed code. Suitable modules to replace are those which are not required for the initial execution of the application. As the application is running locally on the client, additional modules are streamed to the client and the stub code can be dynamically replaced as the substituted procedures are received. The stub procedure can point to a streaming engine which will request a missing procedure if the program calls it before it has been received at the client. Although effective, the stub-code substitution technique used in the "Streaming Modules" system may require a reasonable degree of processing to prepare a given application for streaming. In addition, the client software required to manage the streamed modules does not necessarily integrate cleanly with the normal routines used by the operating system executing on the client machine.

To remedy some of the remaining issues, U.S. Pat. No. 6,574,618 to Eylon et al. disclosed a method and system for executing network streamed applications. Within the system, a client computer executes an application while parts of the application code are still being retrieved from the server over a network. The additional components of the application not required for startup are continuously loaded in the background until the entire application resides on the client computer. There are a number of drawbacks with this system though. The client cannot function without the server being available. Although, the application is physically available on the client once downloaded, due to encryption or other proprietary methods of preventing unauthorized access, the application is unavailable. Further, the prior art does not permit a user to access the server and applications from multiple client locations.

Another technology, defined by Intel, Microsoft and other parties, that allows a computing device to boot an operating system over a local area network is pre-boot execution environment (PXE). The PXE technology uses ROM based software embedded in the end-user hardware that uses enhanced DHCP and TFTP. PXE technology works only over a local area network and not over a wide area network or the Internet. PXE technology requires fast network connections and transfers the entire operating system over the network at each boot, which requires heavy resources on the central site and the network.

SUMMARY OF THE INVENTION

What is needed is an improved system having features for addressing the problems mentioned above and new features not yet discussed. Broadly speaking, the present invention fills these needs by providing a distributed operating system manager. It should be appreciated that the present invention can be implemented in numerous ways, including as a method, a process, an apparatus, a system or a device. Inventive embodiments of the present invention are summarized below.

In one embodiment, a method is provided for managing an operating system over a network, wherein the network is configured to be connected to a boot server and to a client computer. The method comprises retrieving an internet protocol address of the boot server for the client computer; determining whether the boot server is available via the network; transferring to the boot server a description of an operating system on the client computer; validating hardware credentials of the client computer; and determining whether to perform a remote boot process.

In another embodiment, a method is provided for a bootstrap process of a method for managing an operating system over a network is provided, wherein the network is configured to be connected to a boot server and to a client computer. The method comprises moving an existing operating system directory on the client computer to a set-aside location; downloading an operating system directory image from the boot server; comparing cyclic redundancy check values of each appropriate file in the operating system directory with an existing corresponding file in the existing operating system directory; and generating a new operating system directory based on the comparing of the CRC values.

In yet another embodiment, a system for managing an operating system over a network is provided. The system comprises a boot server including an internet protocol address; and a client computer connected to the boot server via the network. The client computer includes a dynamic host configuration protocol client configured to retrieve the internet protocol address of the boot server for the client computer; and a remote operating system boot manager configured to transfer to the boot server a description of an operating system on the client computer, wherein the boot server is configured to validate hardware credentials of the client computer, wherein the remote operating system boot manager determines whether to perform a remote boot process.

In still another embodiment, a client computer for managing an operating system over a network is provided, wherein the client computer is configured to be connected to a boot server via the network. The client computer comprises a dynamic host configuration protocol client configured to retrieve an internet protocol address of the boot server for the client computer; and an remote operating system boot manager configured to transfer to the boot server a description of an operating system on the client computer, wherein the boot server is configured to validate hardware credentials of the client computer, wherein the remote operating system boot manager determines whether to perform a remote boot process.

In yet another embodiment, a boot server for managing an operating system over a network is provided, wherein the boot server is configured to be connected to a client computer via the network. The boot server comprises an internet protocol address; and an operating system directory image for the operating system on the client computer, wherein the client computer includes a dynamic host configuration protocol client configured to retrieve an internet protocol address of the boot server for the client computer and a remote operating system boot manager configured to contact the boot server, wherein the boot server is further configured to validate hardware credentials of the client computer, and wherein the remote operating system boot manager determines whether to perform a remote boot process.

The invention encompasses other embodiments are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION OF THE PREFERRED EMBODIMENT(S)

An invention for a distributed operating system manager (DOSM) is disclosed. Numerous specific details are set forth in order to provide a thorough understanding of the present invention. It will be understood, however, by one skilled in the art, that the present invention may be practiced with other specific details.

Overview of a Distributed Operating System Manager

A DOSM logically centralizes computing device operating systems for physically distributed hardware networks. The DOSM is a mechanism for managing and facilitating the remote operating system of computing devices over slow wide area networks (WAN's) or over the Internet.

Figure 1:
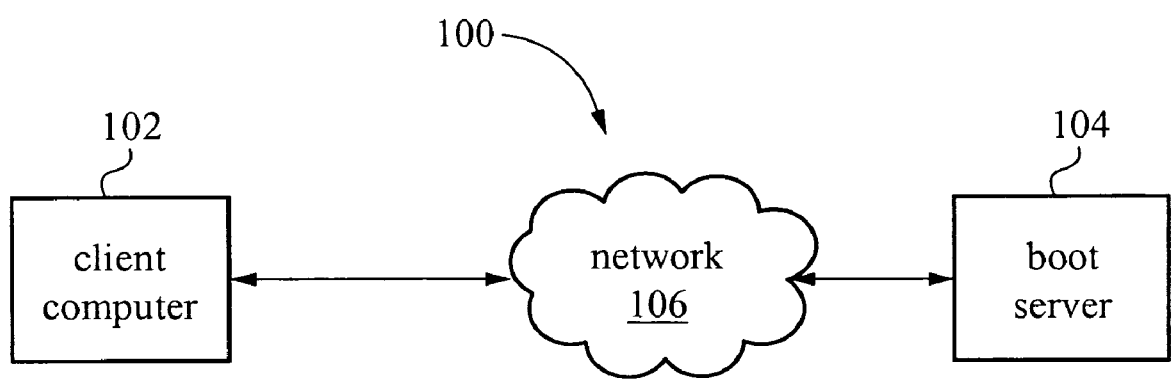
FIG. 1 is a high-level block diagram of a distributed operating system manager, in accordance with the present invention.

FIG. 1 is a high-level block diagram of a distributed operating system manager 100, in accordance with the present invention. The system includes but is not limited to at least one client computer 102 and a boot server 104, which may include multiple server devices. The client computer 102 and the boot server 104 are connected via a network 106.

Remote boot of client computers 102 creates a computing infrastructure, which is less complex and more reliable for the end-user because the software is always up-to-date with the most current software and because the "master" source or copy is centralized and protected on the boot server 104. Damaged operating file systems are replaced at boot time.

The DOSM may be used in conjunction with other technologies that provide movable applications, such as U.S. patent application Ser. No. 11/144,263, entitled "Virtual Application Manager", filed Jun. 2, 2005, and U.S. patent application Ser. No. 11/144,179, entitled "Transaction Based Virtual File System Optimized for High-latency Network Connections", filed Jun 2, 2005. Combining these technologies allows the end-user to be completely free of static software installations and provides a truly movable and managed environment across various hardware platforms.

Figure 2:
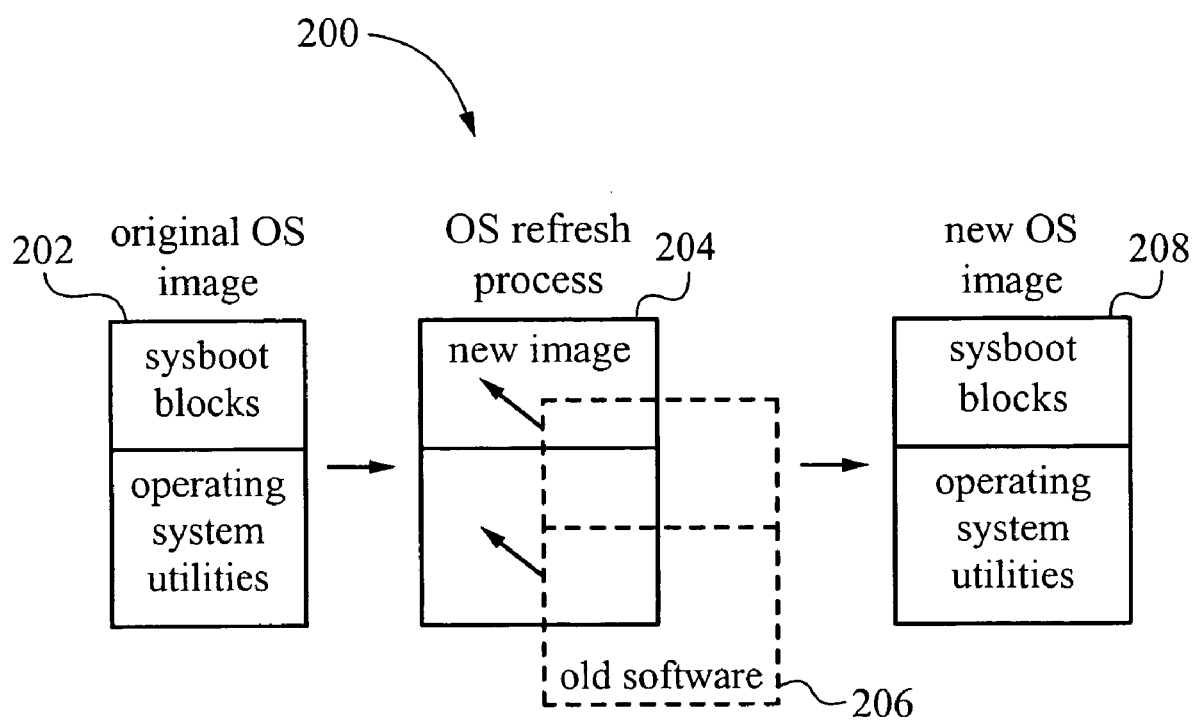
FIG. 2 is a schematic diagram of a bootstrap process, in accordance with the present invention.

FIG. 2 is a schematic diagram of a bootstrap process 200, in accordance with the present invention. The operating system boot image is rebuilt from a saved and set-aside copy of the software images on the client computer 102. These software images may be referred to as the original operating system (OS) image 202, including system boot blocks and operating system utilities. The images that match the central source copies exactly, are then transferred from the set-aside local version and do not need to be transferred across the network. During the OS refresh process 204, file moves are simply directory index updates to the old software 206 to create a new OS image 208. The files themselves do not need to be transferred from their location on disk. This move operation is extremely quick. The entire operation can complete in a few seconds. In a case in which software modules do not match the central version, or the central version is either a newer release, or the local copy has been corrupted or infected, the software modules are transferred from the central source and the local set-aside version is discarded. This process minimizes the amount of network traffic to the central file system and quickens the software refresh process. Data transferred from the central source is further compressed by several mechanisms, further reducing network traffic.

Related Technologies—Virtual Application Manager

The installation of an application on a user device like a PC or PDA requires additional setup. The virtual application manager (VAM) technology performs the tasks of installing application software on a system that is using the virtual file system storage. Some of the features of the VAM include but are not limited to the following: display a catalog of applications for the user to select; map the remote application file system to a local "program files" folder; transfer and install local copies of icons onto the desktop and program start menus; perform other installation duties such as create temporary files, update file permissions, etc.; run any specific setup programs required by the application; and run any custom setup programs created by the administrator of the central servers. The virtual application manager makes selection and installation of software by the user as simple as selecting software from a list in a catalog.

Related Technologies—Communications Manager

The DOSM 100 relies on a secure and reliable network. The communications manager manages at least network monitoring and troubleshooting tools, network automatic disconnect/reconnect solutions, and network interface and technology arbitration technologies.

Related Technologies—User Data Storage

The user data storage is available to manage user files and databases, often associated with user applications. The user data storage system features include but are not limited to remote network storage management of user data, synchronization of local data to remote and vice-versa, secure encrypted storage and management of remote data.

Remote Boot Process

The remote boot process uses a user configured and stored basic input/output system (BIOS) or complimentary metal oxide semiconductor (CMOS) based parameters to control the boot process. Alternatively, the boot parameters and software are loaded into the client device from any appropriate external device such as a compact disc (CD), a USB portable memory device or another appropriate external memory device including a file system. The boot process options include but are not limited to the following: always load a fresh image; load only when the central image has changed; or only reload image when selected manually.

Figure 3:
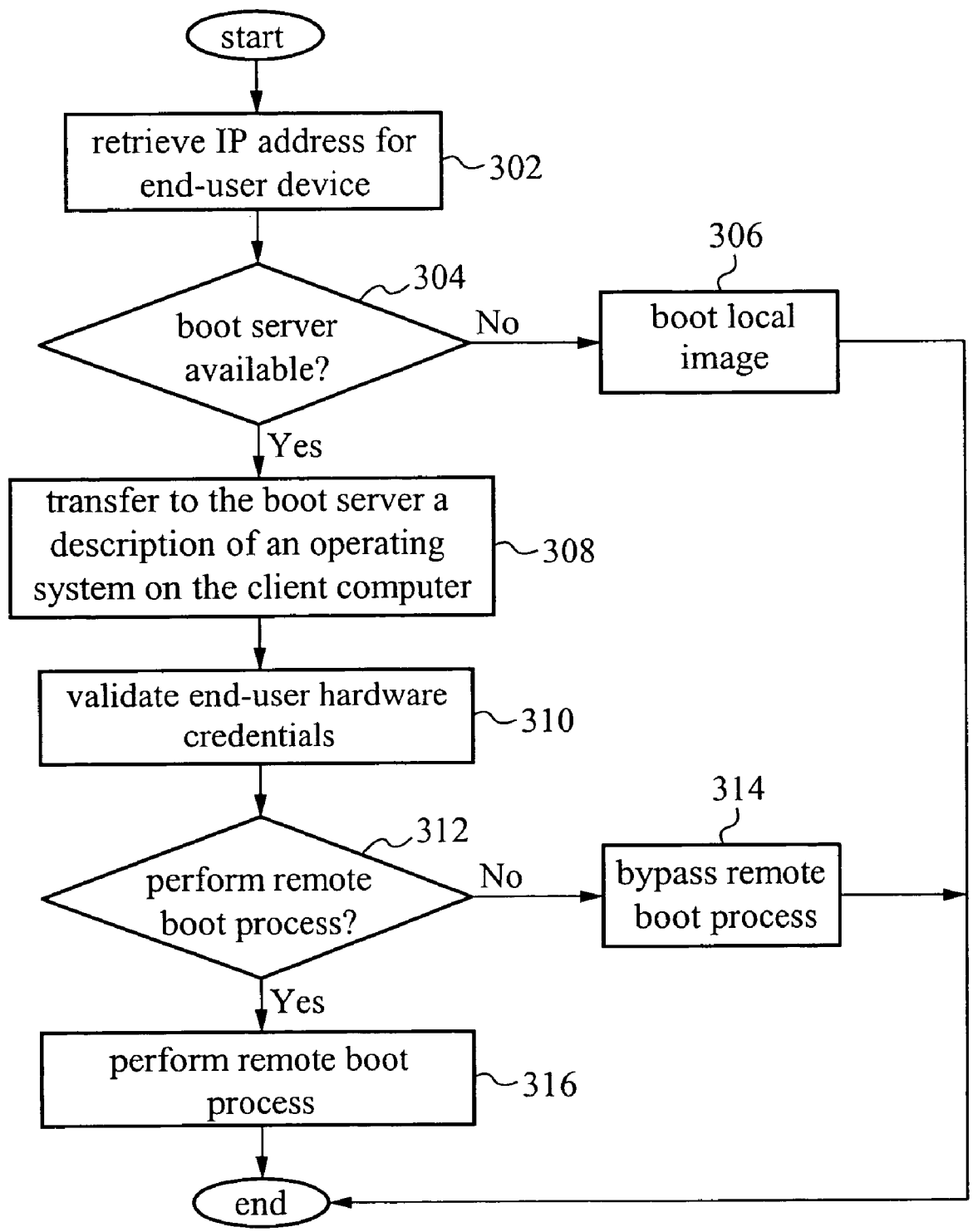
FIG. 3 is a flowchart of a remote boot process, in accordance with the present invention.

FIG. 3 is a flowchart of a remote boot process, in accordance with the present invention. The method starts in step 302 where a read-only memory (ROM) embedded DHCP client retrieves the internet protocol (IP) address of the end-user client computer 102. The local network environment, the internet service provider (ISP) or an appropriately configured external device provides this address. In the decision operation 304, the DOSM 100 determines whether the central boot server 104 is available. If the boot server 104 is unavailable, the DOSM 100 boots the local image of the operating system (OS) in the step 306.

However, if the boot server is available, in the step 308, the ROM embedded remote operating system boot manager contacts the central boot server 104 via its domain name system (DNS) name. The DNS name is a complimentary metal oxide (CMOS) configuration parameter. Alternatively, the DNS name is acquired from an appropriately configured external device, as discussed above. The client computer 102 transfers the license key, the universal unique identifier (UUID) and the current operating system (OS) version to the boot server 104. The transfer protocol preferably uses secure hypertext transfer protocol (HTTPS) and extensible markup language (XML). Alternatively, any other appropriate transfer mechanism format is used.

In the step 308, the boot server 104 validates the end-user hardware (HW) credentials, then replies with an acknowledgment, including but not limited to the operating system image version, the directory image cyclic redundancy check (CRC) and the full image size.

In the decision operation 312, the remote operating system boot manager decides whether to perform the remote boot process. If the directory (DIR) image does not match the server CRC directory image, the DOSM 100 reloads the OS image. If the CMOS parameter is set to always load a fresh image, the DOSM 100 reloads the OS image. If none of these conditions occur, the remote operating system boot manager will decide not to perform a boot process. In such a case, in the step 314, the DOSM 100 bypasses the remote boot and uses the existing OS image.

However, if the remote operating system boot manager decides to perform a boot process, the DOSM 100 proceeds to the step 316 where the remote boot process is performed. Performing the remote boot process includes but is not limited to the following: the DOSM 100 creates a RAM based filed system called a RAMdisk; the DOSM 100 selects the correct bootstrap program based on the OS model coded in CMOS configuration; the DOSM 100 downloads the bootstrap program from the central server; and the DOSM 100 passes program control to the bootstrap program in the RAM file system (RAMFS). The remote boot process is then completed.

Bootstrap Process

The bootstrap program is a mini-kernel with several functions and capabilities. The bootstrap program includes but is not limited to drivers for supported disk hardware and file systems, software to format and partition disk systems, and an extended HTTPS and XML client to retrieve images from central boot servers.

Figure 4:
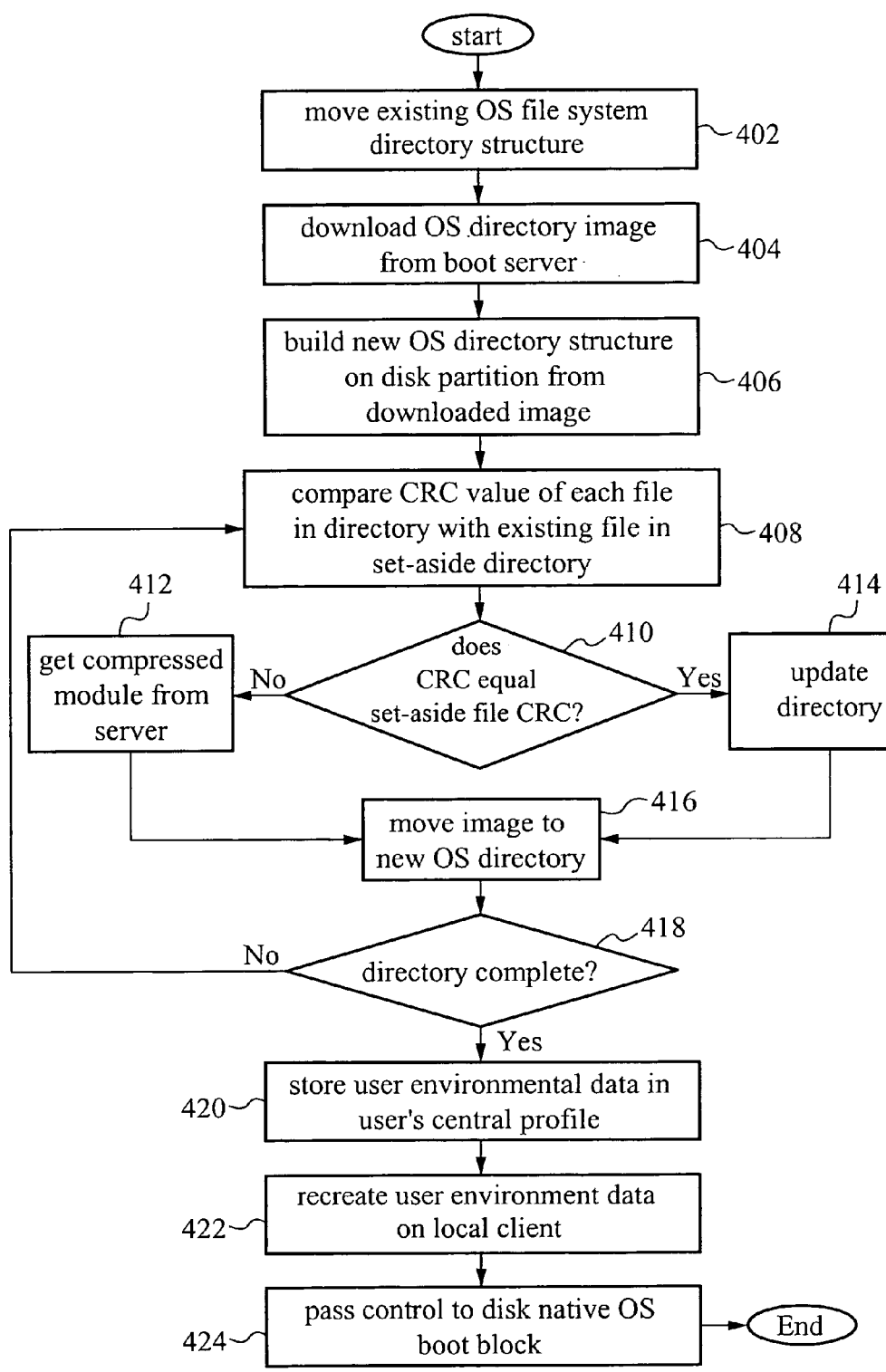
FIG. 4 is a flowchart a bootstrap process, in accordance with the present invention.

FIG. 4 is a flowchart of a bootstrap process 200, in accordance with the present invention. The method starts in the step 402, where the DOSM 100 moves the existing OS file system directory structure, which is set aside for further processing. In the step 404, the DOSM 100 downloads the OS directory image from the server, preferably using HTTPS Get/XML wrapped. Alternatively, the OS directory image is downloaded from the server using any other appropriate transfer mechanism format. The DOSM 100, in the step 406, then builds a new OS directory structure on a disk partition based on the downloaded image. Operations 408 through 418 include the routines for building the new OS directory structure. In the step 408, the DOSM 100 traverses the downloaded directory and compares the CRC value of each file with the existing file in the set-aside directory. In the decision operation 410, it is determined whether the CRC value equals the set-aside file CRC. If the CRC equals the set-aside file CRC, the DOSM 100 renames the file in the step 414. In other words, the DOSM 100 updates the directory. The DOSM 100 efficiently moves the file from the set-aside directory to the new OS directory. However, if the CRC is unequal to the set-aside file CRC, the DOSM 100 gets a compressed module from the boot server 104 in the step 412. This get operation is preferably carried out via an HTTPS Get operation. The compressed module is preferably an XML wrapped binary image.

The method then proceeds to the step 416 where the DOSM 100 moves the image to the new OS directory. In the decision operation 418, it is determined whether the directory is complete. If the directory is not complete, the method returns to the step 408. However, if the directory is complete, in the step 420, the DOSM 100 stores user environmental data in the user's central profile. In the step 422, the DOSM 100 recreates the user environmental data on the local client computer 102. The local data structures created include a system registry database, a page file configuration, and other environmental parameters. The method then proceeds to the step 424 where the DOSM 100 passes control to the disk native OS boot block. The DOSM 100 continues the boot process as a normal BIOS assisted boot. The bootstrap method is then completed.

Boot Loader

A ROM boot loader is software embedded on a ROM chip, installed on every remote operating system boot manager enabled hardware device. Alternatively, the boot loader is installed from an appropriately configured external device with a file system. An end-user computing device must be able to boot from a "raw" hardware system because file system corruption, disk format errors or virus infections require full file system formatting to repair completely. Software retained on ROM is not susceptible to virus infections or disk errors.

A small number of CMOS parameters are writable, and so are possibly susceptible to tampering. Especially critical is the server DNS name parameter, which could be changed to route to an invalid server, which would disable new boot image updates, or to route to a malicious boot server. To prevent tampering, the maintenance of these parameters includes several safeguards, including password control and ROM software logic that prevents parameter modifications from external, non-ROM software.

Functionality of the ROM Boot Loader includes but is not limited to DHCP client software, pre-boot execution environment (PXE) compliant ethernet drivers, simple IP stack and simple proprietary HTTP client to retrieve securely the boot loader program.

Directory Image Download

The end-user computing device operating system is stored on disk as a directory structure. The directory structure is an index to the actual files. The directory contains file names, file statistics, relative file path values and other related parameters. When the directory is transferred from the central server, the directory structure is preferably encoded in an XML format. Fields transferred from the boot server include but are not limited to OS model, OS version, OS patch level, relative directory path, file name, file extension, file size, file CRC value, file time and date statistics.

Each individual file has a CRC value and a hash value. The directory also has a CRC value, which is calculated on a stream of the full file path values, each file name and the CRC for each individual file. A directory CRC from the server should match the CRC on the end-user computing device. When the CRC values do not match, the OS code base does not match and the client version should be replaced.

Disconnected Operation

During the boot process, when a network path between the end-user client computer 102 and the central boot server 104 is disconnected, the remote operating system boot manager system has the capability to boot from the existing end-user operating system. Conventional remote boot systems do not have such capability. However, such capability is important for systems which are not local area network (LAN) based, are mobile or are connected to remote offices or homes where the connection to the central boot server 104 is not guaranteed.

Transfer Acceleration Technologies—Compression

Executable programs and images used by Microsoft® and Unix® systems compress well. Using the Lempel-Ziv-Welch (LZW) compression algorithms and readily available software libraries, images can be typically compressed about fifty percent. This reduces network bandwidth by the same ratio.

Transfer Acceleration Technologies—Sliding CRC

A sliding CRC transfer algorithm is implemented when transferring data when a similar version of data exists on both the source and target location. For example, a source client computer 102 may transfer data to a target boot server 104, or a source boot server 104 may transfer data to a target client computer 102. The target data is interrogated, and the data that is the same as the data at the source is used by the source transfer program without having to transfer data across a network, thereby reducing network traffic and increasing transfer speeds.

A CRC is a calculated value for identifying a data stream by assigning a unique value to the data stream. Two equal data streams will calculate to the same CRC value. So, equal CRC values will identify two identical copies of a data stream.

Figure 5:
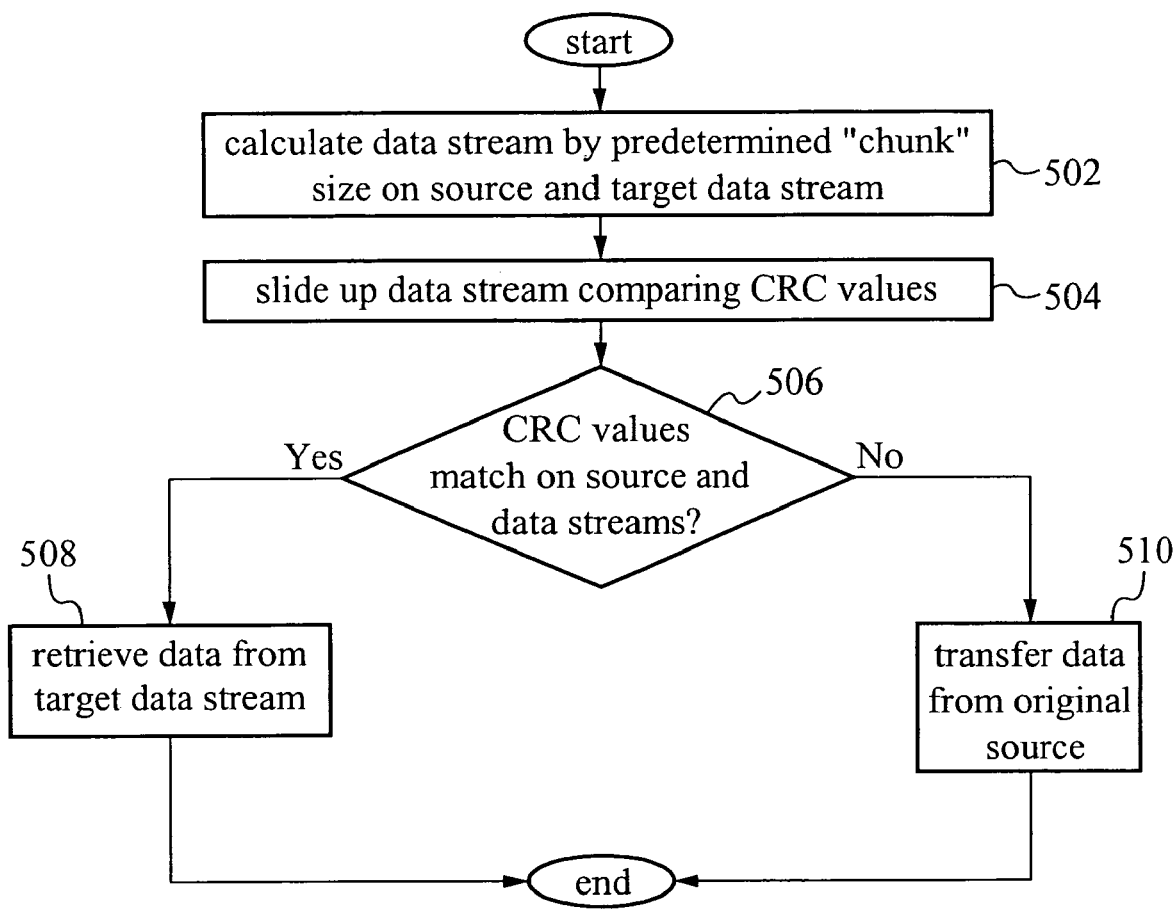
FIG. 5 is a flowchart of a sliding CRC process, in accordance with the present invention.

FIG. 5 is a flowchart of a sliding CRC process, in accordance with the present invention. The method starts in the step 502 where the DOSM 100 calculates a data stream by a pre-determined "chunk" size on the source and the target data stream. In the step 504, the DOSM 100 "slides" up the data stream comparing CRC values. In the decision operation 506, the DOSM 100 determines whether the CRC values of the source and target data streams match. When the CRC values match on the source and target data streams, the data is not transferred from the source. Instead, the data is retrieved from the target data stream in step 508. However when the CRC does not match from the source and target, the data is transferred from the source over the network in step 510. The method for performing a sliding CRC is then completed.

In many cases where the data streams are similar, such as in patched software modules, and in cases where data streams are large, such as in software modules, large network efficiencies are achieved with the sliding CRC method.

Transfer Acceleration Technologies—Prior Image Differential

A prior image differential algorithm is implemented when transferring a data stream update from the source to a target location over a network, and both a new and prior version exists on the source host. The source host uses a current and prior version of a data stream and creates a "differential" data stream with added and deleted information. The differential information is transferred over a network and applied to the target data stream to reconstruct a data stream that is an exact copy of the source. A CRC of the target data stream is returned to the source network client to verify the source and target are exact matches. In a case where there are multiple clients, a collision could result. This prior image differential algorithm is explained in further detail in U.S. patent application Ser. No. 11/144,179, entitled "Transaction Based Virtual File System Optimized For High-Latency Network Connections", filed Jun. 2, 2005.

Environment Creation Process

End-user environment configuration preferences are saved in the user's central profile, and used to recreate the end-user environment. Preferences are saved during the user operating system logoff process. Environmental configuration parameters include but are not limited to page/swap file partition and size parameters, system registry entries, OS tuning parameters, environmental variables, other user preferences not saved in system registries, and system ".INI" files.

Figure 6:
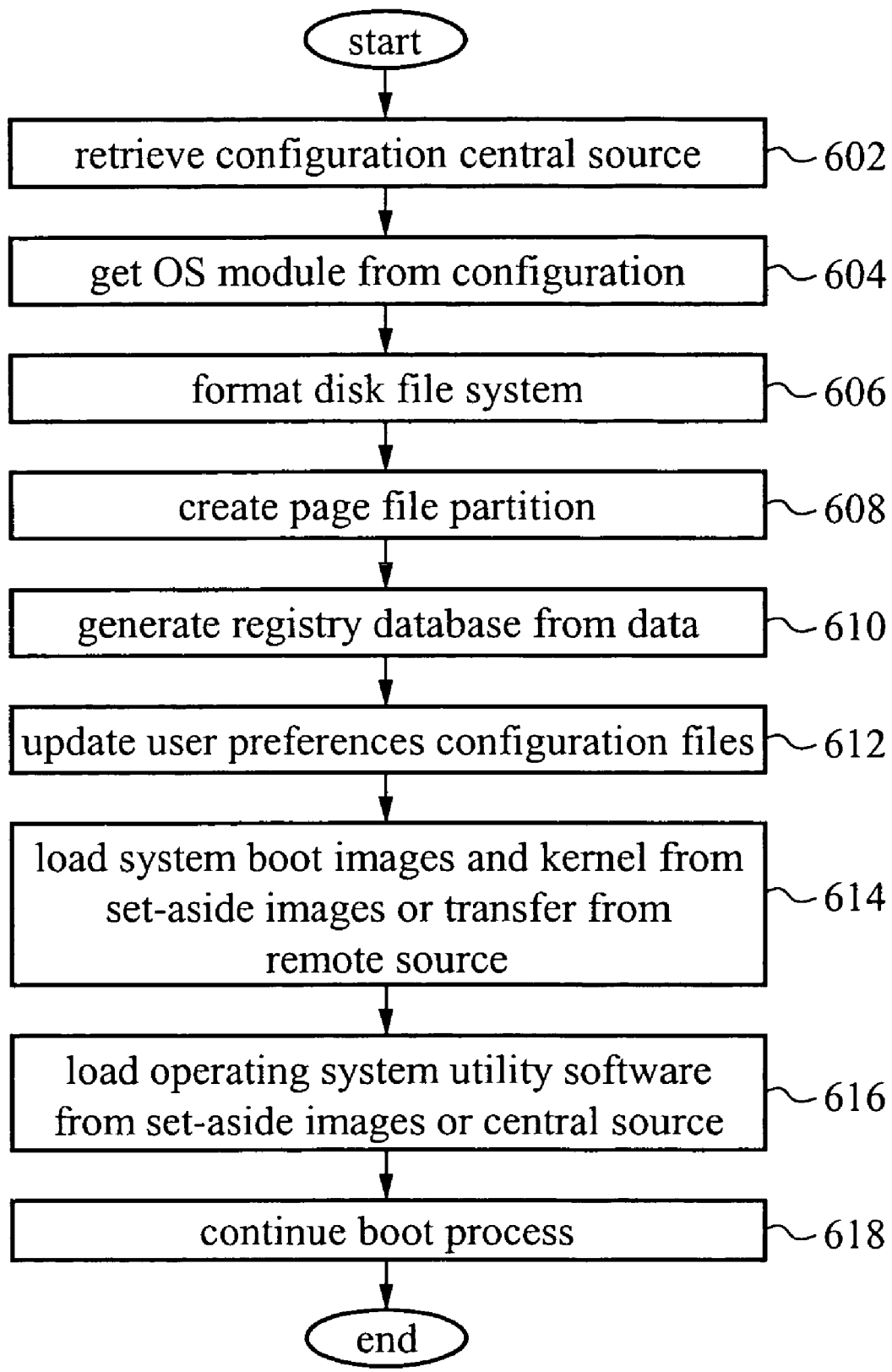
FIG. 6 is a flowchart for an environment creation process, in accordance with the present invention.

FIG. 6 is a flowchart for an environment creation process, in accordance with the present invention. The environment creation algorithm is preferably performed during hardware initialization boot processing, before boot blocks are accessed. In the step 602, the DOSM 100 retrieves the configuration from central source. In the step 604, the DOSM 100 gets the OS model from the configuration. In the step 606, the DOSM 100 formats the disk file system, which is performed optionally during boot process upon user selection of "reset to factory defaults" or "reformat file system". In the step 608, the DOSM 100 creates a page file partition. In the step 610, the DOSM 100 may generate a registry database from the data (performed with Microsoft® operation systems). In the step 612, the DOSM 100 may update user preferences configuration files (performed with Unix® systems). In the step 614, the DOSM 100 loads the system boot images and kernel from the set-aside images, or transfers the system boot images and kernel from the remote boot server 104. In the step 616, the DOSM 100 loads the operating system utility software from the set-aside images or from the central boot server 104. In the step 618, the method continues the boot process as normal. The environment creation process is then completed.

The environment creation process is explained in further detail in U.S. patent application Ser. No. 11/144,263, entitled "Virtual Application Manager", filed Jun. 2, 2005.

In sum, the DOSM 100 provides a technology where the end-user hardware operating system on the client computer 102 is installed fresh with the latest operating system version and patches each time the system boots. Any problem, such as file or disk corruption, user configuration or virus infection is wiped clean at each boot. The DOSM 100 is optimized and advanced beyond typical remote boot technologies because the system is highly optimized to function and boot quickly over a slow network connection and to optionally boot with a prior OS image when the network is not available at the time of boot.

Benefits of this technology for the end-user include but are not to the following: OS maintenance is simple and trouble free; OS maintenance is automated and unattended, requiring no end-user intervention; the end-user client computer 102 is more robust, secure and reliable because any faults or corruptions are corrected at each reboot; OS software is centrally managed and tested by technically trained personnel. Further, the DOSM 100 enhances functionality for enterprise desktop PC's and workstations by reducing maintenances and total cost of ownership of computing hardware. The DOSM 100 increases functionality for consumer systems such as personal computers, personal digital assistants and potentially other internet protocol (IP) enabled appliances, such as televisions, games, consumer electronics and many others.

Capabilities of a Distributed Operating System Manager

The DOSM provides desirable capabilities discussed above and further highlighted in the following discussion.

Remote Boot—End-user devices can boot completely with hardware without any OS components installed, using only ROM embedded software.

Optimized for WAN—The system is optimized to boot over a slow WAN network.

Offline operation—End-user devices can boot with prior OS images when not connected to network.

Virus free—Fresh boots that replace the file system base insures a "clean" install.

Heterogeneous—The DOSM will support substantially any OS technology.

Compatible with current technology—This system will support existing technologies including Microsoft XP®, Microsoft CE® and Linux®.

Secure OS source—The system transport is secure to insure no tampering with the downloaded images.

Centralized—This technology provides the ability for users to use OS and applications, stored and managed at a centralized location.

Firewall friendly—This system uses Web transports, which are typically allowed by most firewall installations. So, the DOSM does not require special firewall configurations.

ASP—The technology has the facilities to support an Application Service Provider (ASP) infrastructure.

Enterprise—The technology has the facilities to support business enterprise environments.

Movable applications—The applications defined within a user's profile will run on any hardware system the user logs into. This mobility allows the user to move from desktop to desktop, and have his applications follow.

Quick installation—The system will load the OS quickly to avoid excessive delays in the boot process.

Patch management—Because the OS is managed centrally, the OS will contain the latest patches implemented by the central site administrator.

Scalability—The system is scalable to support extremely large ASP user bases over disparate network topologies.

License/subscription management—The system supports subscription licenses. So, when the subscription is void or expired, the desktop software will become disabled and inactive.

Subscription Model—This system supports usage limits or quotas, as well as interfaces for activity and storage usage for billing support.

System and Method Implementation of a Virtual Application Manager

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical disks, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including but not limited to retrieving an internet protocol address of the boot server for the client computer, determining whether the boot server is available via the network, transferring to the boot server a description of an operating system on the client computer, validating hardware credentials of the client computer, and determining whether to perform a remote boot process, according to processes of the present invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of managing an operating system over a network, wherein the network is configured to be connected to a boot server and to a client computer, the method comprising:

retrieving an internet protocol address of the boot server for the client computer;

determining whether the boot server is available via the network, wherein if the boot server is unavailable the client computer boots with a prior operating system image;

transferring to the boot server a description of an operating system on the client computer, wherein the description includes a current operating system version;

validating hardware credentials of the client computer;

determining whether to perform a remote boot process; and after transferring to the boot server a description of an operating system on the client computer:

moving an existing operating system directory on the client computer to a set-aside location;

downloading an operating system directory image from the boot server;

comparing cyclic redundancy check values of each file in the operating system directory with an existing file in the existing operating system directory; and generating a new operating system directory based on the comparing of the cyclic redundancy check values by updating the operating system directory for each file in which the cyclic redundancy check values in the operating system directory match with an existing file in the existing operating system directory and by obtaining a compressed module from the boot server for each file in which the cyclic redundancy check values in the operating system directory do not match with an existing file in the existing operating system directory.

2. The method of claim 1, wherein retrieving an internet protocol address is performed by a read-only memory embedded dynamic host configuration client.

3. The method of claim 1, wherein retrieving an internet protocol address comprises retrieving the internet protocol address from an external device.

4. The method of claim 1, wherein the internet protocol address is provided by one of the client computer or an internet service provider.

5. The method of claim 1, further comprising, before the transferring of the description of the operating system, contacting the boot server via a domain name system name of the boot server, wherein the domain name system name is a parameter of a complimentary metal oxide semiconductor configuration.

6. The method of claim 1, wherein the description of the operating system further includes:
   a license key; and
   a universal unique identifier.

7. The method of claim 1, wherein the transferring of the description includes using hypertext transfer protocol and extensible markup language.

8. The method of claim 1, further comprising, after validating hardware credentials, receiving from the boot server an acknowledgment including the operating system image version, the directory image cyclic redundancy check value and the full image size.

9. The method of claim 1, wherein the determining of whether to perform the remote boot process comprises comparing a cyclic redundancy check value of a client directory image to a cyclic redundancy check value server directory image.

10. The method of claim 9, further comprising:
    determining that the cyclic redundancy check values are unequal; and
    receiving the server directory image from the boot server.

11. The method of claim 5, further comprising:
    determining that the complimentary metal oxide semiconductor configuration is set to always load a fresh image; and
    receiving the server directory image from the boot server.

12. The method of claim 1, further comprising:
    bypassing the remote boot process; and
    using the operating system on the client computer.

13. The method of claim 4, further comprising performing the remote boot process including:
    creating a random access memory based file system;
    selecting a correct bootstrap program based on an operating system model coded in the complimentary metal oxide semiconductor configuration;
    downloading the bootstrap program from the boot server; and
    passing program control to the bootstrap program.

14. A system for managing an operating system over a network, the system comprising:
    a boot server including an internet protocol address; and
    a client computer connected to the boot server via the network, the client computer including:
    a dynamic host configuration protocol client configured to retrieve the internet protocol address of the boot server for the client computer, wherein if the boot server is unavailable the client computer boots with a prior operating system image; and
    an input-output bitmap client configured to transfer to the boot server a description of an operating system on the client computer, wherein the boot server is configured to validate hardware credentials of the client computer, wherein the input-output bitmap client determines whether to perform a remote boot process, and wherein the description of the operating system includes a current operating system version and further wherein after transferring to the boot server a description of an operating system on the client computer, the input-output bitmap client moves an existing operating system directory on the client computer to a set-aside location, downloads an operating system directory image from the boot server, compares cyclic redundancy check values of each file in the operating system directory with an existing file in the existing operating system directory and generates a new operating system directory based on the comparing of the cyclic redundancy check values by updating the operating system directory for each file in which the cyclic redundancy check values in the operating system directory match with an existing file in the existing operating system directory and by obtaining a compressed module from the boot server for each file in which the cyclic redundancy check values in the operating system directory do not match with an existing file in the existing operating system directory.

15. A client computer for managing an operating system over a network, wherein the client computer is configured to be connected to a boot server via the network, the client computer comprising:
    a memory device comprising one or more instructions, wherein the one or more instructions, when executed by one or more processors, cause the one or more processors to implement:
    a dynamic host configuration protocol client configured to retrieve an internet protocol address of the boot server for the client computer, wherein if the boot server is unavailable the client computer boots with a prior operating system image; and
    an input-output bitmap client configured to transfer to the boot server a description of an operating system on the client computer, wherein the boot server is configured to validate hardware credentials of the client computer, wherein the input-output bitmap client determines whether to perform a remote boot process, and wherein the description of the operating system includes a current operating system version and further wherein after transferring to the boot server a description of an operating system on the client computer, the input-output bitmap client moves an existing operating system directory on the client computer to a set-aside location, downloads an operating system directory image from the boot server, compares cyclic redundancy check values of each file in the operating system directory with an existing file in the existing operating system directory and generates a new operating system directory based on the comparing of the cyclic redundancy check values by updating the operating system directory for each file in which the cyclic redundancy check values in the operating system directory match with an existing file in the existing operating system directory and by obtaining a compressed module from the boot server for each file in which the cyclic redundancy check values in the operating system directory do not match with an existing file in the existing operating system directory.

16. A boot server for managing an operating system over a network, wherein the boot server is configured to be connected to a client computer via the network, the boot server comprising:
an internet protocol address; and
a memory device comprising one or more instructions, wherein the one or more instructions, when executed by one or more processors, cause the one or more processors to implement an operating system directory image for the operating system on the client computer, wherein the client computer includes a dynamic host configuration protocol client configured to retrieve an internet protocol address of the boot server for the client computer and an input-output bitmap client configured to contact the boot server, wherein if the boot server is unavailable the client computer boots with a prior operating system image, and further wherein the boot server is further configured to receive a description of an operating system, the description including a current operating system version, and to validate hardware credentials of the client computer, and wherein the input-output bitmap client determines whether to perform a remote boot process and further wherein after transferring to the boot server a description of an operating system on the client computer, the input-output bitmap client moves an existing operating system directory on the client computer to a set-aside location, downloads an operating system directory image from the boot server, compares cyclic redundancy check values of each file in the operating system directory with an existing file in the existing operating system directory and generates a new operating system directory based on the comparing of the cyclic redundancy check values by updating the operating system directory for each file in which the cyclic redundancy check values in the operating system directory match with an existing file in the existing operating system directory and by obtaining a compressed module from the boot server for each file in which the cyclic redundancy check values in the operating system directory do not match with an existing file in the existing operating system directory.

17. A memory device comprising one or more instructions for managing an operating system over a network, wherein the network is configured to be connected to a boot server and to a client computer, wherein the one or more instructions, when executed by one or more processors, cause the one or more processors to perform the following:
retrieving an internet protocol address of the boot server for the client computer;
determining whether the boot server is available via the network, wherein if the boot server is unavailable the client computer boots with a prior operating system image;
transferring to the boot server a description of an operating system on the client computer, wherein the description includes a current operating system version;
validating hardware credentials of the client computer;
determining whether to perform a remote boot process; and
after transferring to the boot server a description of an operating system on the client computer:
moving an existing operating system directory on the client computer to a set-aside location;
downloading an operating system directory image from the boot server;
comparing cyclic redundancy check values of each file in the operating system directory with an existing file in the existing operating system directory; and
generating a new operating system directory based on the comparing of the cyclic redundancy check values by updating the operating system directory for each file in which the cyclic redundancy check values in the operating system directory match with an existing file in the existing operating system directory and by obtaining a compressed module from the boot server for each file in which the cyclic redundancy check values in the operating system directory do not match with an existing file in the existing operating system directory.

18. A method of managing an operating system over a network, wherein the network is configured to be connected to a boot server and to a client computer, the method comprising:
retrieving an internet protocol address of the boot server for the client computer;
determining whether the boot server is available via the network;
transferring to the boot server a description of an operating system on the client computer, the description of the operating system comprising a license key;
validating hardware credentials of the client computer and the license key at the boot server;
determining whether to perform a remote boot process at the boot server; and
after transferring to the boot server a description of an operating system on the client computer:
moving an existing operating system directory on the client computer to a set-aside location;
downloading an operating system directory image from the boot server;
comparing cyclic redundancy check values of each file in the operating system directory with an existing file in the existing operating system directory; and
generating a new operating system directory based on the comparing of the cyclic redundancy check values by updating the operating system directory for each file in which the cyclic redundancy check values in the operating system directory match with an existing file in the existing operating system directory and by obtaining a compressed module from the boot server for each file in which the cyclic redundancy check values in the operating system directory do not match with an existing file in the existing operating system directory.

19. A system for managing an operating system over a network, the system comprising:
a boot server including an internet protocol address; and
a client computer connected to the boot server via the network, the client computer including:
a dynamic host configuration protocol client configured to retrieve the internet protocol address of the boot server for the client computer; and
an input-output bitmap client configured to transfer to the boot server a description of an operating system on the client computer, wherein the description includes a license key, wherein the boot server is configured to validate hardware credentials of the client computer and the license key provided by the client computer, and wherein the input-output bitmap client determines whether to perform a remote boot process and further wherein after transferring to the boot server a description of an operating system on the client computer, the input-output bitmap client moves an existing operating system directory on the client computer to a set-aside location, downloads an operating system directory image from the boot server, compares cyclic redundancy check values of each file in the operating system directory with an existing file in the existing operating system directory and generates a new operating system directory based on the comparing of the cyclic redundancy check values by updating the operating system directory for each file in which the cyclic redundancy check values in the operating system directory match with an existing file in the existing operating system directory and by obtaining a compressed module from the boot server for each file in which the cyclic redundancy check values in the operating system directory do not match with an existing file in the existing operating system directory.

20. A boot server for managing an operating system over a network, wherein the boot server is configured to be connected to a client computer via the network, the boot server comprising:

an internet protocol address; and a memory device comprising one or more instructions, wherein the one or more instructions, when executed by one or more processors, cause the one or more processors to implement an operating system directory image for the operating system on the client computer, wherein the client computer includes a dynamic host configuration protocol client configured to retrieve an internet protocol address of the boot server for the client computer and an input-output bitmap client configured to contact the boot server, wherein the boot server is further configured to receive a description of an operating system, the description including a license key, and to validate hardware credentials of the client computer and the license key provided by the client computer, and wherein the input-output bitmap client determines whether to perform a remote boot process and further wherein after transferring to the boot server a description of an operating system on the client computer, the input-output bitmap client moves an existing operating system directory on the client computer to a set-aside location, downloads an operating system directory image from the boot server, compares cyclic redundancy check values of each file in the operating system directory with an existing file in the existing operating system directory and generates a new operating system directory based on the comparing of the cyclic redundancy check values by updating the operating system directory for each file in which the cyclic redundancy check values in the operating system directory match with an existing file in the existing operating system directory and by obtaining a compressed module from the boot server for each file in which the cyclic redundancy check values in the operating system directory do not match with an existing file in the existing operating system directory.

21. A method of managing an operating system over a network, wherein the network is configured to be connected to a boot server and to a client computer, the method comprising:

retrieving an internet protocol address of the boot server for the client computer;

determining whether the boot server is available via the network;

transferring to the boot server a description of an operating system on the client computer, wherein the description of the operating system includes a license key, a universal unique identifier and a current version;

validating hardware credentials of the client computer including replying with an acknowledgment, the acknowledgment including an operating system image version, a directory image cyclic redundancy check (CRC) and a full image size;

determining whether to perform a remote boot process; and after transferring to the boot server a description of an operating system on the client computer:

moving an existing operating system directory on the client computer to a set-aside location;

downloading an operating system directory image from the boot server;

comparing cyclic redundancy check values of each file in the operating system directory with an existing file in the existing operating system directory; and generating a new operating system directory based on the comparing of the cyclic redundancy check values by updating the operating system directory for each file in which the cyclic redundancy check values in the operating system directory match with an existing file in the existing operating system directory and by obtaining a compressed module from the boot server for each file in which the cyclic redundancy check values in the operating system directory do not match with an existing file in the existing operating system directory.

* * * * *